United States Patent [19]
Mizobuchi
[11] Patent Number: 4,778,729
[45] Date of Patent: Oct. 18, 1988

[54] HEAT TRANSFER SHEET

[75] Inventor: Akira Mizobuchi, Tokyo, Japan
[73] Assignee: Dai Nippon Insatsu Kabushiki Kaisha, Tokyo, Japan

[21] Appl. No.: 135,386
[22] Filed: Dec. 21, 1987

Related U.S. Application Data

[63] Continuation of Ser. No. 766,297, Aug. 16, 1985, Pat. No. 4,732,815.

[30] Foreign Application Priority Data

Aug. 20, 1984 [JP] Japan ................................ 59-172998
Aug. 20, 1984 [JP] Japan ................................ 59-172999
May 10, 1985 [JP] Japan ................................ 60-99378

[51] Int. Cl.$^4$ ................................ B32B 9/04
[52] U.S. Cl. ................................ 428/484; 428/195; 428/206; 428/323; 428/327; 428/488.1; 428/488.4; 428/913; 428/914
[58] Field of Search ...................... 428/195, 207, 488.1, 428/488.4, 484, 913, 914, 206, 323, 327

[56] References Cited

U.S. PATENT DOCUMENTS 2,777,781 1/1957 Kordig et al. .................... 428/488.4
4,518,645 5/1985 Moriguchi et al. .............. 428/488.4
4,536,434 8/1985 Magnotta .......................... 428/488.4

FOREIGN PATENT DOCUMENTS 0076044 4/1983 European Pat. Off. ......... 428/488.1
55-003919 1/1980 Japan ................................ 428/488.4
0128897 8/1983 Japan ................................ 428/488.1
0171992 10/1983 Japan ................................ 428/488.4
0114098 6/1984 Japan ................................ 428/488.4
797 2/1987 World Int. Prop. O. ....... 428/488.4

*Primary Examiner*—John E. Kittle
*Assistant Examiner*—P. R. Schwartz
*Attorney, Agent, or Firm*—Parkhurst, Oliff & Berridge

[57] ABSTRACT

A heat transfer sheet comprising a base film and a hot melt ink layer formed on one surface of the base film, said hot melt ink layer comprising one or more components which impart filling to the printed areas of a transferable paper during transferring. Another type of a heat transfer sheet comprising a base film, a hot melt ink layer laminated on one surface of the base film, and a filling layer laminated on the hot melt ink layer, said filling layer comprising one or more components which impart filling to the printed areas of a transferable paper during transferring. According to the heat transfer sheets, high quality printing can be attained even at a high speed without any staining.

3 Claims, No Drawings

HEAT TRANSFER SHEET

This is a continuation of application Ser. No. 766,297 filed Aug. 16, 1985 now U.S. Pat. No. 4,732,815.

BACKGROUND OF THE INVENTION

This invention relates to improvement of a heat transfer sheet (a heat-sensitive transfer sheet), and more particularly, to a heat transfer sheet capable of providing high quality printing even in the case of a transferable paper (i.e., a paper to be transferred) having a low surface smoothness and further capable of preventing any staining (e.g. scumming or smudging) caused by a hot melt ink composition.

When the output print of computers and word processors is printed by heat transfer systems, a heat transfer sheet comprising a hot melt ink layer provided on one surface of a film, as well as at least one thermal head are used. Prior art heat transfer sheets are those which are produced by using, as a base film, papers such as condenser paper and paraffin paper having a thickness of from 10 to 20 μm, or films of plastics such as polyester and cellophane having a thickness of from 3 to 20 μm, and coating on the base film described above a hot melt ink layer wherein pigments are incorporated into waxes. The heat transfer sheet is used in the form of a film or in rolled form in most cases.

In general, however, when heat transfer printing is carried out, a hot melt ink layer of a heat transfer sheet directly contacts with the surface of a transferable paper, and a time lag between the moving velocity of the heat transfer sheet and that of the transferable paper is liable to occur at the time of initiating and stopping the printing or moving to a new line. This is because staining occurs. Particularly, in high-speed printing the staining is liable to occur.

While the heat transfer system can be used to print to commoh papers, distinct printing is not necessarily carried out in all the common papers. It is possible to carry out maximum printing if the transferable papers are calendered wood-free papers or coated papers which exhibit a value of at least 100 seconds when the smoothness of the transferable papers is expressed in terms of Beckmann smoothness. Even in the case of wood-free papers having a value of the order of 50 seconds, sufficient printing quality can be obtained. However, when transferable papers having a low smoothness i.e., less than 50 seconds are used, the distinctiveness of printing is reduced. This is because in the case of papers having very uneven surfaces, an ink composition cannot entirely come into contact with papers under a thermal head-urging pressure and the uncontacted portions exhibit inferior transfer.

Further, the heat transfer system is slower in printing speed as compared with an impact system, and improvement is required. In order to carry out printing at a higher speed, the level of heat energy which is given to a thermal head must be increased. However, this tends to lead to bleeding of printing and to make the staining described above worse.

We have carried out studies in order to overcome the drawbacks and disadvantages described above. It is an object of the present invention to provide a heat transfer sheet wherein no staining is generated even if high speed heat transfer is carried out and wherein distinct printing can be obtained even in the case of transferable papers having a low surface smoothness.

SUMMARY OF THE INVENTION

We have manufactured and tested heat transfer sheets comprising various elements. As a result, we have now found that the provision of an ink layer or filling layer comprising specific materials on the transferable paper-contacting surface of a heat transfer sheet is extremely effective for achieving the object described above. That is to say, a heat transfer sheet according to a first embodiment of the present invention is characterized in that one surface of a base film is provided with a hot melt ink layer having an action of effecting filling of printed areas of a transferable paper during transfer. Specifically, this hot melt ink layer comprises an ink composition having a melt viscosity of from 10 cps to 60 cps at 100° C.

Further, a heat transfer sheet according to a second embodiment of the present invention is characterized in that one surface of a base film is provided with a hot melt ink layer, and a filling layer effecting filling of printed areas of a transferable paper during transfer, in this order. In a preferred embodiment of the present invention, the filling layer described above comprises waxes and/or resins, and may contain extender pigments, as needed. Further, in another embodiment of the present invention, the melting point of the hot melt ink layer is from 40° to 80° C., and the melting point of the filling layer is from 50° to 100° C. and 10 to 60 degrees higher than that of the hot melt ink layer.

In another embodiment of the present invention, the thermal head-contacting surface may be provided with an antisticking layer.

In another embodiment of the present invention, a base film may have a mat layer on its surface to which an ink layer is applied; or the base film surface to which ink layer is applied may be mat processed.

In a further embodiment of the present invention, a releasable layer may be interposed between a base film and an ink layer.

In a still further embodiment of the present invention, each layer of a heat transfer sheet, particularly, an antisticking layer and/or filling layer may contain an antistatic agent.

DETAILED DESCRIPTION OF THE INVENTION

Each material, etc. of a heat transfer sheet of the present invention will be described in detail hereinafter.

Base Film

A conventional base film can be used as it is, as a base film used in the present invention. Other films can be used. The base film of the present invention is not particularly restricted. Examples of the base film materials include plastics such as polyester, polypropylene, cellophane, polycarbonate, cellulose acetate, polyethylene, polyvinyl chloride, polystyrene, nylon, polyimide, polyvinylidene chloride, polyvinyl alcohol, fluorine resins, rubber hydrochloride, and ionomers; papers such as condenser paper, and paraffin paper; and nonwoven fabrics. Composite films thereof may be also used.

The thickness of this base film can suitably vary depending upon materials in order to obtain appropriate strength and thermal conductivity. The thickness of the base film is, for example, from 1 to 25 μm, preferably from 3 to 25 μm.

Hot Melt Ink Layer having a Filling Effect

In a heat transfer sheet according to a first embodiment of the present invention, an ink layer comprises a hot melt ink composition having a melt viscosity of from 10 cps to 60 cps at 100° C.

A hot melt ink composition of a prior art heat transfer sheet has a melt viscosity of from about 100 to about 150 cps at 100° C., and therefore the hot melt ink composition used in the first embodiment of the present invention has a low viscosity which has not been heretofore used.

Due to the low viscosity of the hot melt ink composition, the wetting of the heated molten ink composition (by thermal heads) to a transferable as well as a filling effect of printed areas are improved. The low viscosity of the hot melt ink composition facilitates the migration of the ink composition to areas wherein the contact of the transfer sheet with paper is incomplete. Thus, high printing quality can be obtained.

If the melt viscosity at 100° C. of hot melt ink composition is higher than 60 cps, the expected effect cannot be obtained. If the melt viscosity is lower than 10 cps, bleeding may occur and thus printing quality is deteriorated.

A hot melt ink layer comprises a coloring agent and a vehicle, and may contain various additives, as needed.

The coloring agents include organic or inorganic pigments or dyes. Preferred of these are pigments or dyes having good characteristics as recording materials, for example, those pigments or dyes having a sufficient color density and exhibiting no discoloration or fading under conditions such as light, heat and humidity.

The coloring agents may be materials wherein while they are colorless when they are not heated, they form color on heating. The coloring agents may be such materials that they form color by contacting it with a material contained in a transferable sheet. In addition to the coloring agents which form cyan, magenta, yellow and black, coloring agents having other various colors can be used. That is to say, the hot melt ink composition contains, as coloring agents, carbon black or various dyes or pigments selected depending upon color which is desired to provide to the ink composition.

Waxes, drying oils, resins, mineral oils, celluloses and rubber derivatives and the like, and mixtures thereof can be used as such vehicles.

Preferred examples of waxes are microcrystalline wax, carnauba wax and paraffin wax. In addition, representative examples of waxes which can be used include various eaxes such as Fischer-Tropsch wax, various low molecular weight polyethylene and partially modified waxes, fatty acid esters, amides, Japan wax, bees wax, whale wax, insect wax, wool wax, shellac wax, candelilla wax, and petrolatum.

Examples of the resins which can be used include ethylene-vinyl acetate copolymer (EVA), ethylene-ethyl acrylate copolymer (EEA), polyethylene, polystyrene, polypropylene, polybutene, petroleum resins, vinyl chloride resins, polyvinyl alcohol, vinylidene chloride resins, methacrylic resins, polyamide, polycarbonate, fluorine resins, polyvinyl formal, polyvinyl butyral, acetyl cellulose, nitrocellulose, vinyl acetate resins, polyisobtylene and polyacetal.

In order to impact good thermal conductivity and melt transferability to the ink layer, a thermal conductive material can be incorporated into the ink composition. Such materials include carbonaceous materials such as carbon black, and metallic powders such as aluminum, copper, tin oxide and molybdenum disulfide.

The hot melt ink layer can be directly or indirectly coated onto the base film by hot melt coating, ordinary printing or coating methods such as hot lacquar coating, gravure coating, gravure reverse coating, roll coating, gravure printing and bar coating, or many other means. The thickness of the hot melt ink layer should be determined such that the balance between the density of necessary printing and heat sensitivity is obtained. The thickness is in the range of from 1 to 30 μm, and preferably from 1 to 20 μm.

Hot Melt Ink Layer

A hot melt ink layer used in the second embodiment of the present invention comprises a coloring agent and a vehicle, and may contain various additives, as needed.

The coloring agents include organic or inorganic pigments or dyes. Preferrred of these are pigments or dyes having good characteristics as recording materials, for example, those pigments or dyes having a sufficient color density and exhibiting no discoloration or fading under conditions such as light, heat and humidity.

The coloring agents may be materials wherein while they are colorless when they are not heated, they form color on heating. The coloring agents may be such materials that they form color by contacting it with a material contained in a transferable sheet. In addition to the coloring agents which form cyan, magenta, yellow and black, coloring agents having other various colors can be used. That is to say, the hot melt ink composition contains, as coloring agents, carbon black or various dyes or pigments selected depending upon color which is desired to provide to the ink composition.

Waxes, drying oils, resins, mineral oils, celluloses and rubber derivatives and the like, and mixtures thereof can be used as such vehicles.

Preferred examples of waxes are microcrystalline wax, carnauba wax and paraffin wax. In addition, representative examples of waxes which can be used include various waxes such as Fischer-Tropsch wax, various low molecular weight polyethylene and partially modified waxes, fatty acid esters, amides, Japan wax, bees wax, whale wax, insect wax, wool wax, shellac wax, candelilla wax, and petrolatum.

Examples of the resins which can be used include EVA, EEA, polyethylene, polystyrene, polypropylene, polybutene, petroleum resins, vinyl chloride resins, polyvinyl alcohol, vinylidene chloride resins, methacrylic resins, polyamide, polycarbonate, fluorine resins, polyvinyl formal, polyvinyl butyral, acetyl cellulose, nitrocellulose, vinyl acetate resins, polyisobutylene and polyacetal.

In order to impart good thermal conductivity and melt transferability to the ink layer, a thermal conductive material can be incorporated into the ink composition. Such materials include carbonaceous materials such as carbon black, and metallic powders such as aluminum, copper, tin oxide and molybdenum disulfide.

The hot melt ink layer can be directly or indirectly coated onto the base film by hot melt coating, ordinary printing or coating methods such as hot lacquer coating, gravure coating, gravure reverse coating, roll coating, gravure printing and bar coating, or many other means. The thickness of the hot melt ink layer should be determined such that the balance between the density of necessary printing and heat sensitivity is obtained. The thickness is in the range of from 1 to 30 μm, and preferably from 1 to 20 μm.

Filling Layer

In the present invention, a filling layer has both an action of effecting filling of printed areas of a transferable paper during transferring and a function of preventing staining of the printed areas. That is to say, in printing, a conventional heat transfer sheet is liable to generate staining of the transferable paper due to rubbing between the heat transfer sheet and the transferable paper. On the contrary, the present heat transfer sheet having the filling layer does not incur staining even if rubbing occurs because the surface portion of the filling layer only adheres to the transferable paper and the filling layer prevents the ink layer from directly contacting with the transferable paper. Further, when the hardness of the coating film of the filling layer is high (for example, carnauba wax, candelilla wax and the like), the degree of adhesion of the filling layer to the transferable paper is more reduced, little staining may occur.

The term "filling" as used herein includes both (a) a case wherein the surface concave of the transferable paper is packed with a filler to exhibit filling, and (b) another case wherein a filler migrates onto the transferable paper while keeping the film state to come into contact with the surface convex to secure it, thus the concave is clogged in the form like a bridge, and consequently the surface of printed areas becomes smooth.

In the present invention, the filling layer comprises waxes and/or resins, and may contain extender pigments, as needed.

The melting point of the filling layer can be selected depending upon the temperature of a thermal head used. It is preferred that the melting point of the filling layer be in the range of from 40° to 150° C.

Examples of preferred waxes are microcrystalline wax, carnauba wax, and paraffin wax. In addition to such waxes, representative examples of waxes which can be used include various waxes such as Fischer-Tropsch wax, various low molecular weight polyethylenes and partially modified waxes, fatty acid esters and amides, Japan wax, bees wax, whale wax, insect wax, wool wax, shellac wax, candelilla wax, petrolatum, and vinyl ether waxes such as octadecyl vinyl ether.

The wax used in the filling layer and the wax used in the hot melt ink layer described above are the same or different. In a preferred embodiment of the present invention, both waxes can be different as follows: the filling layer is provided on the hot melt ink layer; vehicles such as relatively low melting wax are used in both layers; and the hot melt ink composition having a lower melting point as compared with the filling layer, for example, from 40° to 80° C. is used. Thereby, the heat sensitivity of the ink composition is increased, and high speed heat transfer becomes possible. By forming the filling layer which comes into contact with the transferable paper from the materials having a higher melting point as compared with the hot melt ink layer, for example, from 50° to 100° C., little bleeding of printing occurs in heat transfer at a high energy level. Accordingly, appropriate combinations can be determined such that the above melting point range and difference in melting point, for example 10°-60° C. are met.

Examples of resins used in the filling layer include polyethylene, chlorinated polyethylene, chlorosulfonated polyethylene, ethylene-vinyl acetate copolymer (EVA), ethylene-ethyl acrylate copolymer (EEA), ionomers, polypropylene, polystyrene, styrene-acrylonitrile copolymer (AS resins), ABS resins, polyvinylformal resins, methacrylate resins, cellulose acetate resins, maleic acid resins, polyvinyl chloride, polyvinylidene chloride, vinyl chloride-acrylonitrile copolymer, vinylidene chloride-acrylonitrile copolymer, vinyl chloride-vinyl acetate copolymer, vinyl chloride-vinyl propionate copolymer, polyvinyl acetate, polyvinyl alcohol, polyvinyl acetal, polyvutene resins, acrylic resins, fluorine resins, isobutylene-maleic anhydride copolymer, polyamide resins, nitrile rubbers, acrylic rubbers, polyisobutylene resins, polycarbonate resins, polyacetal resins, polyalkylene oxide, saturated polyester resins, silicone resins, phenol resins, urea resins, melamine resins, furan resins, alkyd resins, unsaturated polyester resins, diallyl phthalate resins, epoxy resins, polyurethane resins, modified rosin, rosin, hydrogenated rosin, rosin ester resins, maleic acid resins, ketone resins, xylene resins, vinyltoluenebutadiene resins, polycaprolactone resins, ethyl cellulose resins, polyvinyl butyral resins, vinyltolueneacrylate resins, terpene resins, aliphatic, aromatic, copolymer or alicyclic petroleum resins, cellulose derivatives such as methyl cellulose, hydroxyethyl cellulose and nitrocellulose, and copolymers and blend polymers thereof.

It is recommended that an appropriate amount of an extender pigment be incorporated into the filling layer because the bleeding and tailing of printing can be prevented.

It is unsuitable that the particle diameter of the extender pigment be too large. Examples of extender pigment suitable for use herein include inorganic bulking agents such as silica, talc, calcium carbonate, precipitated barium sulfate, alumina, titanium white, clay, magnesium carbonate and tin oxide.

If the amount of the extender pigment used is too small, the effect obtained is poor. If the amount is more than 60%, dispersibility is reduced, thus it is difficult to prepare an ink composition and the coating obtained is liable to peel off from the base film. Accordingly, it is desirable that the extender pigment be added in an amount of from 0.1 to 60% by weight.

As described above, the filling layer may contain a coloring agent (e.g. pigments or dyestuffs) if necessary or may not contain any coloring agent. If the coloring agent is used, the combination of the coloring agent of the filling layer with the coloring agent of the ink layer provides recording having a sufficient density. If only a colorless vehicle is used, it is possible to prevent such a situation that the transferable paper and the ink layer are directly contacted to rub to cause staining.

Further, a coloring agent having a masking effect, such as titanium white, is advantageously used, for example, to sharply develop the color of the transferred ink by virtue of the effect of masking the color of the surface of the transferable paper.

The filling layer can be also coated by various techniques. It is suitable that the thickness of this layer be from about 0.1 to 30 μm.

Antisticking Layer

If the material from which a base film is produced has a low degree of heat tolerance, it is preferable that the thermal head-contacting surface be provided with a layer for preventing sticking to the thermal head since high energy and heat are transmitted by the thermal head when printing is carried out under a low temperature atmosphere or at a high speed. The following compositions can be used for preparing the antisticking layer.

(a) Compositions containing (i) a thermoplastic resin having an OH or COOH group, such as acrylpolyol, urethane having an OH group, and vinylchloride-vinylacetate copolymer, polyesterpolyol, (ii) a compound having at least 2 amino groups, diisocyanate or triisocyanate, (iii) a thermoplastic resin, and (iv) a material which acts as a heat relasing agent or lubricant.

(b) Compositions containing (i) a resin such as silicon-modified acrylic resin, silicone-modified polyester resin, acrylic resin, polyester resin, vinylidene fluoride resin, vinylidene fluoride-ethylene tetrafluoride copolymer resin, polyvinyl fluoride resin, and acrylonitrile-styrene copolymer resin, and (ii) a heat releasing agent or lubricant. Examples of the heat releasing agents or lubricants are materials which melt on heating to exhibit their action, such as for example waxes and amides, esters or salts of higher fatty acids; and materials which are useful in the form of solid per se, such as for example fluorine resins and inorganic material powders.

The provision of such an antisticking layer makes it possible to carry out thermal printing without occurring sticking even in a heat transfer sheet wherein a heat unstable plastic film is used as a substrate. The merits of plastic films such as good resistance to cutting and good processability can be put to practical use.

Mat Layer and Mat Processing

While heat transfer generally provides glossy and beautiful printing, it is difficult to read the printed documents in some cases. Accordingly, mat printing may be desirable. In this case, a heat transfer sheet which provides mat printing can be produced by coating a dispersion of inorganic pigments such as silica and calcium carbonate in a resin dissolved in a suitable solvent, onto a base film to form a mat layer, and coating a hot melt ink composition onto the mat layer. Alternatively, a base film per se may be mat processed to use the mat processed base film.

Of course, the present invention can be applied to a heat transfer sheet for color printing, and therefore a multicolor heat transfer sheet is also included in the scope of the present invention.

Releasable Layer

A releasable layer is provided in order to improve the releasability between the base film and the ink layer. Thus, transfer efficiency is improved and release sound is reduced. When the releasable layer remains on the surface of the ink layer after releasing the releasable layer also functions as a protective layer for the printed areas, and contributes to improvement of abrasion resistance of the printed image.

The following can be preferably used as materials from which the releasable layer is produced.

(a) Resins
- (i) Silicone resins.
- (ii) Mixture of a silicone resin and a thermoplastic or thermosetting resin which is compatible therewith.
- (iii) Silicone-modified resins such as silicone-modified acryl and silicone-modified polyesters.
- (iv) PVA, protein, amino acid resins, gelatin, vinylidene fluoride, chlorinated polyethylene, NC, CAP, CAB, NC/isocyanate, CAP/isocyanate, CAB-/isocyanate, polyamide, polycaprolactone and the like.

(b) Thermoplastic Resin + Releasing Agent
- (i) Releasing Agent Waxes such as silicone-modified wax, polyethylene, paraffin and microcrystalline wax; higher fatty acid, higher fatty acid amides, higher fatty acid esters, and higher fatty acid salts; higher alcohols; and phosphoric esters such as lecithin.
- (ii) Thermoplastic Resins Acrylic resins, polyester resins, vinylidene fluoride resins, maleic acid resins, polyamides, polycaprolactone, vinylidene fluoride-tetrafluoroethylene copolymer resins, polyvinyl fluoride resins, acrylonitrile-styrene copolymer resins, acryl-vinyl chloride copolymer resins, nitrile rubbers, nylon, polyvinylcarbazole, rubber chloride, cyclized rubbers, polyvinyl acetate resins, polyvinyl chloride resins, vinyl chloride-vinyl acetate copolymer resins and the like.

(c) Waxes
- (i) All waxes such as paraffin wax, microcrystalline wax, carnauba wax and montan wax.
- (ii) Silicone-modified waxes.
- (iii) Higher alcohols.
- (iv) Higher fatty acids, higher fatty acid amides, higher fatty acid esters and higher fatty acid salts.
- (v) Phosphoric esters such as lecithin.

Antistatic Agents

In order to overcome drawbacks due to static electricity, it is recommended that at least one layer of the heat transfer sheet contains an antistatic agent. The antistatic agent can be incorporated into any of the base film, the ink layer, the filling layer and the antisticking layer. Particularly, it is preferable that the antistatic agent be incorporated into the antisticking layer and/or the filling layer.

Antistatic agents used in the present invention include any known antistatic agent. Examples of antistatic agents include a variety of surfactant-type antistatic agents such as various cationic antistatic agents having cationic groups such as quaternary ammonium salt, pyridinium salt and primary, secondary or tertiary amino groups; anionic antistatic agents having anionic groups such as sulfonate, sulfate, phosphate and phosphonate; amphoteric antistatic agents of amino acid type, aminosulfate type or the like; and nonionic antistatic agents of amino-alcohol type, glycerin type, polyethylene glycol type or the like. Further antistatic agents include polymeric antistatic agents obtained by polymerizing the antistatic agents as described above. Other antistatic agents which can be used include polymerizable antistatic agents such as radiation polymerizable monomers and oligomers having tertiary amino or quaternary ammonium groups, such as N,N-dialkylaminoalkyl(meth)acrylate monomers and quaternarized products thereof.

Particularly, the use of such polymerizable antistatic agents can provide stable antistatic properties for a long period of time because these antistatic agents integrate with the formed resin layer.

In order to indicate more fully the nature and utility of this invention, the following examples are set forth, it being understood that these examples are presented as illustrative only and are not intended to limit the scope of the invention. All parts used herein are by weight unless otherwise specified.

EXAMPLE 1

The following raw materials were blended in proportions (% by weight) shown in Table 1 to prepare a hot melt ink composition having a filling effect.

| | Abbreviation |
|---|---|
| Carbon black "Diablack G" (manufactured by Mitsubishi Kasei, Japan) | CB |
| Ethylene-vinyl acetate copolymer "Evaflex 310" (manufactured by Mitsui Polychemical, Japan) | EVA |
| Paraffin wax "Paraffin 150° F." (manufactured by Nippon Seiro, Japan) | PW |
| Carnauba wax | CW |

The melt viscosity of the resulting ink composition at 100° C. (represented by "Vis.") was measured by means of a B-type viscometer. The results obtained are also shown in Table 1.

TABLE 1

| | CB | EVA | PW | CW | Vis |
|---|---|---|---|---|---|
| Comparative Example 1-1 | 15 | 8 | 47 | 30 | 135 |
| Example 1-1 | 14 | 6 | 48 | 32 | 90 |
| Example 1-2 | 10 | 5 | 51 | 34 | 60 |
| Example 1-3 | 10 | 4 | 53 | 34 | 45 |
| Example 1-4 | 6 | 2 | 56 | 36 | 30 |
| Example 1-5 | 6 | 1 | 57 | 36 | 20 |

The hot melt ink composition was coated onto a polyester base film (6 μm) to a thickness of about 5 μm to form a heat transfer ribbon.

This ribbon was used in a commercially available heat transfer printer, and common papers having various smoothnesses were used as transferable papers to examine transferability.

A degree of the ink composition applied was measured by means of a dot analyzer "Alliadack 1500" (manufactured by Konishiroku Shashin Kogyo, Japan), and the transferability was represented in terms of a percent area dot.

The results are shown in Table 2. When the percent area dot is 80% or more, it can be said that this is fully high quality printing visually.

TABLE 2

| Smoothness | 4.6 sec. | 10.1 sec. | 33.1 sec. | 52.1 sec. |
|---|---|---|---|---|
| Comparative Example 1-1 | 47.9% | 54.1% | 66.6% | 81.6% |
| Example 1-1 | 50.9 | 60.5 | 77.6 | 86.5 |
| Example 1-2 | 57.3 | 63.5 | 81.3 | 90.2 |
| Example 1-3 | 67.0 | 82.5 | 84.5 | 93.4 |
| Example 1-4 | 80.3 | 84.2 | 86.5 | 97.0 |
| Example 1-5 | 82.3 | 86.1 | 90.2 | 97.2 |

Comparative Example 1-1 corresponds to a prior art heat transfer ribbon. If it is a wood-free paper having a smoothness of at least 50 seconds, good printing can be carried out. However, in the case of papers having a low smoothness, the printing quality becomes inferior.

As can be seen from Table 2, this example using the ink composition having a low melt viscosity can provide high quality printing even in the case of papers having a considerably low smoothness.

Further, above examples were repeated except that an antisticking layer was formed using the following composition. High quality printing is attained even at a low temperature (0° C.).

| Antisticking Layer: | |
|---|---|
| Vinylidene fluoride-tetrafluoroethylene copolymer "Kainer K 7201" (manufactured by Pennwalt Corporation) | 5 parts |
| Polyester polyol "SP-1510" (manufactured by Hitachi Kasei, Japan) | 4 parts |
| CAB "Sellit BP 700-25" (manufactured by Bayer Aktiengesellschaft) | 1 part |
| Polyethylene wax "FC 113" (manufactured by Adeka Argus Chemical Co., Ltd., Japan) | 1 part |
| Fluorocarbôn "F-57" (manufactured by Accell) | 0.5 part |
| MEK | 60 parts |
| Toluene | 30 parts |

The antisticking layer was coated in an amount of 0.5 g/m$^2$ (on a dry basis; the coating weight is similarly described on a dry basis) by a gravure coating process.

EXAMPLE 2

Example 1 was repeated except that an ink composition for mat layer having the following formulation was prepared before coating a hot melt ink composition having a filling effect onto a base film.

| | |
|---|---|
| Polyester resin "Byron 200" (manufactured by Toyobo, Japan) | 6 parts |
| Vinyl chloride-vinyl acetate copolymer resin "Vinyllite VAGH" (manufactured by UCC) | 7 parts |
| Silica "Erozeal OK 412" (manufactured by Nippon Aerozyl, Japan) | 3 parts |
| Talc "Microace L-1" (manufactured by Nippon Talc, Japan) | 1 part |
| Methyl ethyl ketone | 30 parts |
| Toluene | 30 parts |

A 50% butyl acetate solution of isocyanate "Takenate D-204" (manufactured by Takeda Seiyaku Kogyo, Japan) was incorporated into the ink composition at a weight ratio of the mat composition to isocyanate solution of 20:3, and thereafter the mixture was coated onto a base film. The amount is 1 g/m$^2$.

A heat transfer ribbon was prepared and the transferability was measured in the same manner as described in Example 1. The resulting heat transfer ribbon exhibited similar performance, and provided mat readable printing.

EXAMPLE 3

The following hot melt ink and filler compositions were prepared.

| | |
|---|---|
| Composition of a Hot Melt Ink Layer: | |
| 15 parts of CB, 8 parts of EVA, 47 parts of PW and 30 parts of CW used in Example 1. | |
| Composition of a Filler Layer: | |
| Natural wax emulsion "Diejet T-10" (a melting point of 80° C.; 30% solid; manufactured by Gooh Kagaku, Japan) | 57 parts |
| Paraffin wax emulsion "Diejet EK" | 43 parts |

-continued

| | |
|---|---|
| (a melting point of 55° C.; 33% (solid); manufactured by Gooh Kagaku, Japan) | |

The hot melt ink and filler compositions described above were coated onto a polyester base film (6 μm) to a thickness of 3 μm and 2 μm, respectively, thereby forming a heat transfer ribbon.

This ribbon was used in a commercially available heat transfer printer, and common papers having various smoothnesses were used as transferable papers to examine transferability in the same manner as described in Example 1.

The results obtained are shown in the following Table 3.

For comparison, a transfer ribbon having only a hot melt ink layer having a thickness of 5 μm without providing any filling layer was used. The results are also shown in Table 3.

TABLE 3

| Smoothness | 4.6 sec. | 10.1 sec. | 33.1 sec. | 52.1 sec. |
|---|---|---|---|---|
| Example 3-1 | 80.6% | 82.3% | 86.1% | 92.1% |
| Comparative Example 3-1 | 47.9 | 54.1 | 66.6 | 81.6 |

In the case of Comparative Example which corresponds to a prior art heat transfer ribbon, if it is a wood-free paper having a smoothness of 50 seconds or more, good printing can be carried out. However, in the case of papers having a low smoothness, the printing quality becomes inferior.

On the contrary, in this example using the transfer sheet having the filling layer, high quality printing can be obtained even in the case of papers having a considerably low smoothness.

In this example, a transfer sheet was then formed wherein the thermal heat-contacting surface was provided with an antisticking layer having the following composition.

| Antisticking Layer: | |
|---|---|
| Vinylidene fluoride-tetrafluoro-ethylene copolymer (Kainer 7201, manufactured by Pennwalt Corporation) | 8 parts |
| Polyester polyol (40% MEK solution of Kaserak XU-534 TV, manufactered by Takeda Yakuhin Kogyo, Japan) | 40 parts |
| Fluorocarbon (F-57, manufactured by Accell) | 5 parts |
| Benzoguanamine resin powder (Epostar-S, manufactured by Nippon Shokubai Kagaku, Japan) | 3 parts |
| Lecithin (manufactured by Azinomoto, Japan) | 1 part |
| MEK | 35 parts |
| Toluene | 45 parts |

A mixture of the composition described above and isocyanate (Collonate L; 75% ethyl acetate solution; manufactured by Nippon Polyurethane, Japan) at a weight ratio of composition to isocyanate of 45:3 was coated by a gravure printing (0.5 g/m$^2$), and dried at a temperature of 100° C. to form an antisticking layer.

High quality printing is attained even at a low temperature (0° C.).

EXAMPLE 4

Example 3 was repeated except that an extender pigment was added to the filler composition of Example 3.

| | |
|---|---|
| Composition of a Filler Layer: | |
| "Diejet T-10" | 50 parts |
| "Diejet EK" | 20 parts |
| Silane-treated silica emulsion | 30 parts |
| "Bond wax WE-3" (10% solids; manufactured by Bond Wax Company) | |

As shown in the following Table, excellent transferability and printing performance similar to those of Example 3 were obtained.

TABLE 4

| Smoothness | 4.6 sec. | 10.1 sec. | 33.1 sec. | 52.1 sec. |
|---|---|---|---|---|
| Example 4 | 80.1% | 82.5% | 87.3% | 91.4% |

EXAMPLE 5

Example 3 was repeated except that a heat transfer ribbon was prepared wherein a mat layer was formed using the same composition as that of Example 2 in the same manner as described in Example 2. The transferability was similar to that of Example 3, and mat readable printing was obtained.

EXAMPLE 6

A heat transfer ribbon was prepared using the same materials as those of Example 3 in the same manner as described in Example 3 except that a filler having the following composition was used. When transferability was examined in the same manner as described in Example 3, the results as shown in the following Table 5 were obtained.

| Composition of a Filling Layer: | |
|---|---|
| Polycaprolactone "Daisel PCLH 1" (manufactured by Daisel Kagaku, Japan) | 30 parts |
| Ethyl acetate | 70 parts |

TABLE 5

| Smoothness | 4.6 sec. | 10.1 sec. | 33.1 sec. | 52.1 sec. |
|---|---|---|---|---|
| Example 6-1 | 81.2% | 85.3% | 86.7% | 89.1% |
| Comparative Example 3-1 | 47.9 | 54.1 | 66.6 | 81.6 |

EXAMPLE 7

Example 6 was repeated except that the following blend was used wherein an extender pigment was added to the filler of Example 6.

| Composition of a Filling Layer: | |
|---|---|
| "Daisel PCLH 1" | 30 parts |
| Silica "Erozeal OK-412" (manufactured by Nippon Aerozyl, Japan) | 5 parts |
| Ethyl acetate | 65 parts |

Transferability was further improved and printing performance was improved as shown hereinafter.

TABLE 6

| Smoothness | 4.6 sec. | 10.1 sec. | 33.1 sec. | 52.1 sec. |
|---|---|---|---|---|
| Example 7 | 81.5% | 86.3% | 89.4% | 92.2% |

EXAMPLE 8

Example 6 was repeated except that a heat transfer ribbon was prepared wherein a mat layer was formed using the same composition as that of Example 2 in the same manner as described in Example 2. Transferability was similar to that of Example 6, and mat readable printing was obtained.

EXAMPLE 9

A polyethylene terephthalate film having a thickness of 3.5 μm was used as a base film, and a hot melt ink composition comprising first and second layers containing the following components was coated onto one surface of the base sheet by the following processes.

| First layer having a melting point of 60° C. and a thickness of 4 μm: | |
|---|---|
| Carnauba wax | 20 parts |
| Paraffin wax (Paraffin 145° F.) (manufactured by Nippon Seiro, Japan) | 60 parts |
| Carbon black "Siest SO" (manufactured by Tokai Denkyoku, Japan) | 15 parts |
| Ethylene-vinyl acetate copolymer "Evaflex 310" (manufactured by Mitsui Polychemical, Japan) | 8 parts |

The above components were kneaded for 6 hours at a temperature of 120° C. using an attritor, and coated at a temperature of 120° C. by a hot melt roll coating process.

| Second layer having a melting point of 82° C. and a thickness of 0.5 μm: | |
|---|---|
| Carnauba emulsion "WE-90" (40% solids aqueous emulsion, manufactured by Bond Wax Co.) | 10 parts |
| 60% isopropanol aqueous solution | 15 parts |

The second layer was coated by a gravure coating process.

An antisticking layer having the following composition was then formed onto the thermal head-contacting surface of the base film.

| Antisticking Layer: | |
|---|---|
| 40% xylene solution of silicone-modified acrylic resin "KR 5208" (manufactured by Shinetsu Kagaku, Japan) | 10 parts |
| Fluorocarbon "F-57" (manufactured by Accell) | 3 parts |
| Antistatic agent "Arcard T 50" (manufactured by Lion Agzo, Japan) | 1.2 parts |
| Toluene | 40 parts |
| Xylene | 40 parts |
| Butanol | 15 parts |

The antisticking layer was coated in an amount of 0.1 gram per square meter by a gravure coating process.

The heat transfer sheet described above was used, and wood-free papers having a high smoothness and medium papers having a low smoothness were used as transferable papers. A commercially available thermal head was used to carry out heat transfer printing. At energy of the thermal head of 0.7 mJ/dot, high speed printing of 40 words per second could be carried out even in a low temperature (0° C.) atmosphere in the case of all transferable papers with high quality.

EXAMPLE 10

The same base film as that of Example 9 was used, and the following two layers were coated thereon.

| First layer having a melting point of 60° C. and a thickness of 4 μm: | |
|---|---|
| The same layer as that of Example 9; | |
| Second layer having a melting point of 74° C. and a thickness of 0.5 μm: | |
| Carnauba non-aqueous emulsion "4U-1128B (isopropanol emulsion containing 25% solids, manufactured by Nippon Carbide Kogyo, Japan) | 10 parts |
| Candelilla wax (25% isopropanol dispersion) | 5 parts |
| Carbon black described above | 0.5 part |
| Polybutene "2000 HEM 75AS" | 0.2 part |
| Isopropanol | 2 parts |

The layers were coated by a gravure coating process. This heat transfer sheet also exhibited good transfer performance.

EXAMPLE 11

Example 9 was repeated except that a heat transfer sheet was prepared wherein a mat layer was formed using the same composition as that of Example 2 in the same manner as described in Example 2. This transfer sheet provided mat high quality printing.

EXAMPLE 12

Example 9 was repeated except that carbon black in the composition of the first layer was replaced with the same amount of a red pigment to form a hot melt ink composition and the composition was coated by a gravure reverse process at a temperature of 120° C.

A product obtained by reacting hexamethylene disocyanate with ethyl alcohol at an equivalent weight at a temperature of 80° C. for 10 hours was used. A hot melt ink composition for a second layer comprises the following components.

| | |
|---|---|
| Product described above | 30 parts |
| Red dye (C.I. 15850) | 3 parts |
| Ethyl alcohol | 50 parts |
| Isopropanol | 17 parts |

This composition was coated onto the first layer by a gravure coating process to form a second layer having a coating film thickness of 0.5 μm on a dry basis.

The resulting heat transfer sheet provided sharp red printing.

EXAMPLE 13

A polyethylene terephthalate film having a thickness of 3.5 μm was used as a base film. Hot melt ink and filler compositions comprising the following components were prepared, and coated onto one surface of the base film, respectively, in the same manner as described in Example 9.

| Composition of a Hot Melt Ink Layer: | |
|---|---|
| CB | 15 parts |
| EVA | 8 parts |
| PW | 50 parts |
| CW | 25 parts |
| Composition of a Filling Layer: | |
| 155° F. Paraffin wax emulsion "WE-70" (40% solids aqueous emulsion manufactured by Bond Wax Co.) | 10 parts |
| 60% isopropanol aqueous solution | 15 parts |

There was used the above heat transfer sheet wherein the thickness of the ink layer and filling layer was 3.5 μm and 0.8 μm, respectively. Several different papers (wood-free paper having a high smoothness and medium paper having a low smoothness) were used as transferable papers. A commercially available thermal head was used to carry out heat transfer printing. At energy of thermal head of 0.7 mJ/dot, high speed printing of 40 words per second could be carried out in the case of all transferable papers with high quality without any staining.

EXAMPLE 14

The same base film as that of Example 13 was used and two layers having the following composition were coated thereon.

| Composition of a Hot Melt Ink Layer: | |
|---|---|
| The same as that of Example 13 | |
| Composition of a Filling Layer: | |
| 155° F. Paraffin wax emulsion "WE-70" (40% solids aqueous emulsion manufactured by Bond Wax Company) | 70 parts |
| Silane-treated silica emulsion "Bond Wax WE-3" (10% Solids; manufactured by Bond Wax Company) | 30 parts |
| 50% Isopropanol aqueous solution | 50 parts |

The filling layer was coated in an amount of 0.5 g/m$^2$ by a gravure coating process.

This heat transfer sheet having the thickness of the ink layer and filling layer of 3.5 μm and 0.5 μm, respectively, exhibited transfer performance as well as that of Example 13.

EXAMPLE 15

The same base film as that of Example 13 was used, and three layers having the following composition were coated thereon.

| Composition of an Antisticking Layer: | |
|---|---|
| 40% Xylene solution of Silicone-modified acrylic resin "KR 5208" (manufactured by Shinetsu Kagaku, Japan) | 10 parts |
| Fluorocarbon "F-57" (manufactured by Accell) | 3 parts |
| Toluene | 40 parts |
| Xylene | 40 parts |
| Butanol | 15 parts |

The antisticking layer was coated in an amount of 0.1 g/m$^2$ by a gravure coating process.

| Composition of a Hot Melt Ink Layer: | |
|---|---|
| The same as that of Example 13 | |
| Composition of a Filling Layer: | |
| Carnauba emulsion "WE-90" (40% solids; manufactured by Bond Wax Company) | 10 parts |
| 70% Isopropanol aqueous solution | 10 parts |

The filling layer was coated in an amount of 0.3 g/m$^2$ by a roll coating process.

The transfer sheet of this example having the thickness of the ink layer and filling layer of 3.5 μm and 0.3 μm, respectively, also exhibited good transfer performance even in a low temperature (0° C.) atmosphere without any sticking and without any staining.

EXAMPLE 16

A polyethylene terephthalate film having a thickness of 3.5 μm was used as a base film. Hot melt ink and filler compositions comprising the following components were prepared. They were coated onto one surface of the base film by respective processes.

Composition of the Hot Melt Ink Layer: 15 parts of CB, 8 parts of EVA, 50 parts of PW and 25 parts of CW in Example 1

The above components were kneaded for 6 hours at a temperature of 120° C. using an attritor. This was applied in an amount of 4 g/m$^2$ at a temperature of 120° C. by a hot melt roll coating process.

| Composition of the Filling Layer: | |
|---|---|
| Polyamide resin "DPX-1163" (manufactured by Henkel Hakusui) | 10 parts |
| Toluene | 10 parts |
| Isopropanol | 10 parts |

The filling layer was coated in an amount of 2 g/m$^2$ by a gravure coating process.

There was used the above heat transfer sheet wherein the thickness of the ink layer and filling layer was 4 μm and 2 μm, respectively. Several papers (i.e., wood-free paper having a high smoothness and medium paper having a low smoothness) were used as transferable papers. A commercially available thermal head was used to carry out heat transfer printing. At energy of the thermal head of 0.7 mJ/dot, high speed printing of 40 words/second was carried out in the case of all transferable papers without any staining.

EXAMPLE 17

The same base film as that of Example 16 was used, and two layers having the following composition were coated.

| Composition of the Hot Melt Ink Layer: | |
|---|---|
| The same as that of Example 16 | |
| Composition of the Filling Layer: | |
| Polyamide resin "Leomide 2185" (manufactured by Kao Sekken, Japan) | 10 parts |
| Silica "Erozeal OK-412" (manufactured by Nippon Aerozyl, Japan) | 1 part |

-continued

| | |
|---|---|
| Isopropanol | 25 parts |

The filling layer was coated in an amount of 1.3 $g/m^2$ by a gravure coating process.

The transfer sheet of this example having the thickness of the ink layer and filling layer of 4 μm and 1.3 μm, respectively, exhibited good transfer performance without any staining.

EXAMPLE 18

The same base film as that of Example 16 was used, and two layers having the following composition were coated.

| | |
|---|---|
| Composition of the Hot Melt Ink Layer: | |
| The same as that of Example 16 | |
| Composition of the Filling Layer (Note: Colored): | |
| Acrylic resin "Acrynal 57-86" (manufactured by Toei Kasei, Japan) | 10 parts |
| Vinyl chloride-vinyl acetate "Denkarack 61" (manufactured by Kanegafuchi Kagaku Kogyo, Japan) | 10 parts |
| Silica "Erozeal OK 412" (manufactured by Nippon Aerozyl, Japan) | 2 parts |
| Ethylene glycol | 10 parts |
| Toluene | 100 parts |
| Ethyl acetate | 80 parts |
| Carbon black "Dia Black G" (manufactured by Mitsubishi Kasei, Japan) | 2 parts |

The filling layer was coated in an amount of 1 $g/m^2$ by a gravure coating process.

The transfer sheet of this example having the thickness of the ink layer and filling layer of 4 μm and 1 μm, respectively, also exhibited transfer performance as well as Example 16 even at higher density with little staining.

EXAMPLE 19

The same base film as that of Example 16 was used, and four layers having the following composition were coated.

| | |
|---|---|
| Composition of the Antisticking Layer: | |
| The same as that of Example 9 | |
| Composition of the Mat Layer: | |
| The same as that of Example 2 (coated in an amount of 0.4 $g/m^2$) | |
| Composition of the Hot Melt Ink Layer: | |
| The same as that of Example 16 | |
| Composition of the Filling Layer: | |
| Carnauba emulsion "WE-90" 40% solids (manufactured by Bond Wax Company) | 10 parts |
| EVA "Polysol EVAAD-5" 56% solids (manufactured by Showa Kobunshi, Japan) | 5 parts |
| 50% Isopropanol aqueous solution | 10 parts |

The filling layer was coated in an amount of 1.0 $g/m^2$ by a gravure coating process.

The transfer sheet of this example having the thickness of the ink layer and filling layer of 4 μm and 1 μm, respectively, also exhibited transfer performance as well as that of Example 16, even in a low temperature (0° C.) atmosphere without any staining.

EXAMPLE 20

The same base film as that of Example 16 was used, and two layers having the following composition were coated.

| | | |
|---|---|---|
| Composition of the Hot Melt Ink Layer: | | |
| The same as that of Example 16 | | |
| Composition of the Filling Layer: | | |
| (i) | Paraffin Wax "HNP-3" (manufactured by Nippon Seiro, Japan) | 10 parts |
| (ii) | EEA "MB-830" (manufactured by Nippon Konika,Japan) | 4 parts |
| (iii) | Silica "Erozeal OK 412" (manufactured by Nippon Aerozyl, Japan) | 1 part |
| (iv) | Carbon black "Siest SO" (manufactured by Tokai Denkyoku, Japan) | 1.5 parts |
| (v) | Xylol | 30 parts |

Preparation: (ii) and (v) are dissolved with stirring to prepare a varnish. This varnish, (iii) and (iv) are mixed and the mixture is dispersed for 6 hours by means of an attritor. The attritor is then heated to a temperature of from 60° to 70° C., and previously heated/dissolved (i) is added to and dispersed in the mixture for one hour to prepare a coating solution.

Coating: The coating solution is coated at a temperature of 60° C. in an amount of 0.5 $g/m^2$ by a gravure coating process.

The transfer sheet of this example having the thickness of the ink layer and filling layer of 4 μm and 0.5 μm, respectively, also exhibited good transfer performance even at higher density with little staining as the case of Example 16.

EXAMPLE 21

The same base sheet as Example 16 was used to prepare a transfer sheet wherein a releasable layer, an antisticking layer, an ink layer and a filling layer having the following composition were formed on the base sheet.

| Releasable Layer: | |
|---|---|
| 40% Xylene solution of silicone-modified resin (KR 5208 manufactured by Shinetsu Kagaku Kogyo, Japan) | 10 parts |
| Toluene | 40 parts |
| Xylene | 40 parts |
| Butanol | 15 parts |

The releasable layer was coated in an amount of

| Hot Melt Ink Layer: | |
|---|---|
| Carbon black "Siest SO" (manufactured by Tokai Denkyoku, Japan) | 15 parts |
| Ethylene-vinyl chloride copolymer "Evaflex 310" (manufactured by Mitsui Polychemical, Japan) | 10 parts |
| Paraffin wax "Paraffin 150° F." | 40 parts |
| Carnauba wax | 15 parts |

The above components were kneaded for 6 hours at a temperature of 120° C. using an attritor. The kneaded mass was coated at a temperature of 120° C. in an amount of 5 $g/m^2$ by a hot melt roll coating process.

| Filling Layer: | |
|---|---|
| Carnauba emulsion "WE-90" (40% solids; manufactured by Bond Wax Company) | 10 parts |
| 75% IPA aqueous solution | 10 parts |

The filling layer was coated in an amount of 1 $g/m^2$ by a gravure coating process. Antisticking Layer:

The composition was the same as that of Example 1. The antisticking layer was coated in an amount of 0.3 $g/m^2$.

This transfer sheet was evaluated for printing in the same manner as described in Example 16. This transfer sheet exhibited good transfer performance against all transferable papers without any staining. Printing could be carried out without any release noise. Also, even in a low temperature atmosphere (0° C.), high quality printing was obtained.

EXAMPLE 22

The same base film as that of Example 16 was used to prepare a transfer sheet wherein a releasable layer and an ink layer having the following composition were

| Releasable Layer: | |
|---|---|
| Polyester resin "Byron 200" (manufactured by Toyobo Co, Japan) | 10 parts |
| Silicone-modified wax "KF3935" (manufactured by Shinetsu Kagaku, Japan) | 5 parts |
| Methyl ethyl ketone (MEK) | 50 parts |
| Toluene | 50 parts |

The releasable layer was coated in an amount of 0.1 $g/m^2$ by a gravure coating process. Hot Melt Ink Layer:

The same as that of Example 21.

This transfer sheet was evaluated for printing in the same manner as described in Example 16. This transfer sheet exhibited good transfer performance against all transferable papers without any release noise.

EXAMPLE 23

The same base film as that of Example 16 was used to prepare a transfer sheet wherein a releasable layer, a filling layer and an ink layer having the following composition were formed on the base film.

| Releasable Layer: | |
|---|---|
| Montan wax | 10 parts |
| Xylene | 50 parts |
| Toluene | 40 parts |

The releasable layer was coated in an amount of 0.7 $g/m^2$ by a gravure coating process while warming to 50° C.

| Hot Melt Ink Layer: | |
|---|---|
| Product obtained by reacting hexamethylene diisocyanate with | |
| Ethyl alcohol at an equivalent weight (80° C., 10 hours) | 30 parts |
| Vinyl acetate "Esneal C-50" | 6 parts |
| Carbon black "Siest SO" (manufactured by Tokai Denkyoku, Japan) | 6 parts |

-continued

| Hot Melt Ink Layer: | |
|---|---|
| Ethyl alcohol | 50 parts |
| IPA | 20 parts |

The ink layer was coated in an amount of 3 $g/m^2$ by a gravure coating process.

Filling Layer: The same as that of Example 13 (coated in an amount of 1 $g/m^2$)

This transfer sheet exhibited good transfer performance against all transferable papers without any staining. Printing could be carried out without any release noise. In case of this example, the releasable layer also functions as a protective layer for the printed areas.

EXAMPLE 24

The same base film as that of Example 16 was used to prepare a transfer sheet wherein a releasable layer and an ink layer having the following composition were formed on the base film.

| Releasable Layer: | |
|---|---|
| Polyamide resin (Leomide 2185 manufactured by Kao Sekken, Japan) | 10 parts |
| IPA | 100 parts |

The releasable layer was coated in an amount of 1 $g/m^2$ by a gravure coating process.

Hot Melt Ink Layer: The same composition as that of Example 23 was coated in an amount of 3 $g/m^2$.

In the case of this example, the releasable layer also functions as a protective layer for the printed areas because the releasable layer remains in such a form that the surface of the printed area is coated with the releasable layer after transfer.

This transfer sheet exhibited good transfer performance against all transferable papers and printing could be carried out without any release noise.

EXAMPLE 25

The same base film as that of Example 16 was used to prepare a transfer sheet wherein a primer layer, a releasable layer and an ink layer having the following composition were formed on the base film.

| Primer Layer: | |
|---|---|
| Polyester polyol (PTI 49002 manufactured by E. I. Du Pont de Nemours and Company) | 10 parts |
| MEK | 50 parts |
| Toluene | 50 parts |

The primer layer was coated in an amount of 0.5 $g/m^2$ by a gravure coating process.

| Releasable Layer: | |
|---|---|
| PVA 205 (manufactured by Kurare, Japan) | 10 parts |
| Water | 60 parts |
| Ethanol | 40 parts |

The releasable layer was coated in an amount of 1 $g/m^2$ by a gravure coating process.

Hot Melt Ink Layer: The same as that of Example 21

When a releasable layer is formed from materials which are not readily adhered to a PET base film and readily released from the hot melt ink layer, such as PVA, it is preferable to provide a primer layer to obtain adhesion between the base film and the releasable layer, as shown in this example.

Other processes for improving adhesion include those processes wherein the surface of the base film is subjected to corona and plasma treatments by a conventional method.

This transfer sheet was evaluated for printing in the same manner as described in Example 16. This transfer sheet exhibited good transfer performance without any release noise.

EXAMPLE 26

A PET film having a thickness of 6 μm was used as a base film to prepare a transfer sheet wherein an antisticking layer and an ink layer having the following composition were formed on the base film.

| Antisticking Layer: | |
|---|---|
| Vinylidene fluoride-tetrafluoroethylene copolymer "Kainer K 7201" (manufactured by Pennwalt Corporation) | 5 parts |
| Polyester polyol "SP-1510" (manufactured by Hitachi Kasei, Japan) | 4 parts |
| CAB "Sellit BP700-25" (manufactured by Bayer Atienzesellschaft) | 1 part |
| Polyethylene wax "FC113" (manufactured by Adeka Argus Chemical Co., Ltd., Japan) | 1 part |
| Fluorocarbon "F-57" (manufactured by Accell) | 0.5 part |
| Antistatic agent "Elenon 19M" (manufactured by Daiichi Kogyo Seiyaku, Japan) | 0.6 part |
| MEK | 60 parts |
| Toluene | 30 parts |

The antisticking layer was coated in an amount of 0.5 $g/m^2$ by a gravure coating process.

| Hot Melt Ink Layer: | |
|---|---|
| Carbon black "Siest SO" (manufactured by Tokai Denkyoku, Japan) | 10 parts |
| Ethylene-vinyl acetate copolymer "Evaflex 310" (manufactured by Mitsui Polychemical, Japan) | 4 parts |
| Paraffin wax "Paraffin 150° F." | 53 parts |
| Carnauba wax | 34 parts |

The ink composition had melt viscosity of 45 cps at 100° C.

The above components were kneaded for 6 hours at a temperature of 120° C. using an attritor. The kneaded mass was coated at a temperature of 120° C. in an amount of 4 $g/m^2$ by a holt melt roll coating process.

The obtained heat transfer sheet was evaluated for antistatic property by using a static honest meter (Shishido Shokai, Japan).

Comparative example was prepared in the same manner as described above except that an antistatic agent (Elenon 19M) was excluded from an antisticking layer. Example 26 exhibited high antistatic property as follows.

| | Saturated Potential | Half-life Period |
|---|---|---|
| Comparative Example | −1500 V | ∞ |
| Example 26 | −300 V | 5 seconds |

Condition: 25° C., 60%
−10 kV (applied voltage)
30 seconds (applied time)

EXAMPLE 27

The same base film as that of Example 26 was used, and the same ink layer as that of Example 26 was formed. Further, an antistatic agent layer having the following composition was formed onto the base film surface opposite to the ink layer.

| Antistatic Agent Layer: | |
|---|---|
| Stachside concentrated solution (manufactured by TDK, Japan) | 1 part |
| IPA | 200 parts |

Coating was carried out by a gravure coating process using a 150 line/inch cylinder having a plate depth of 40 μm.

The obtained transfer sheet was evaluated for printing in the same manner as described in Example 26. This transfer sheet exhibited high antistatic property as follows.

| | Saturated Potential | Half-life Period |
|---|---|---|
| Example 27 | −500 V | 7 seconds |

EXAMPLE 28

A PET containing an antistatic agent was used as a base film, and the same ink layer as that of Example 26 was formed to prepare a transfer sheet.

The obtained transfer sheet was evaluated for printing in the same manner as described in Example 26. This transfer sheet exhibited high antistatic property as follows.

| | Saturated Potential | Half-life Period |
|---|---|---|
| Example 28 | −600 V | 10 seconds |

EXAMPLE 29

The same base film as that of Example 26 was used, and an ink layer containing a quaternary ammonium salt (cationic) antistatic agent having the following composition and a filling layer were formed to prepare a transfer sheet.

| Hot Melt Ink Layer: | |
|---|---|
| Product obtained by reacting hexamethylene diisocyanate with ethyl alcohol at an equivalent weight (80° C., 10 hours) | 30 parts |
| Vinyl acetate "Esneal C-50" (manufactured by Sekisui Kagaku, Japan) | 6 parts |
| Carbon black "Siest SO" (manufactured by Tokai Denkyoku, | 6 parts |

-continued

| Hot Melt Ink Layer: | |
|---|---|
| Japan) | |
| Stachside concentrated solution (manufactured by TDK, Japan) | 3 parts |
| Ethyl alcohol | 50 parts |
| IPA | 70 parts |

The hot melt ink layer was coated in an amount of 3.0 $g/m^2$ by a gravure coating process.

Filling Layer: The same as that of Example 13 except that stachside concentrated solution (TDK) was added in an amount of 0.05 part.

The filling layer was coated in an amount of 0.8 $g/m^2$.

This transfer sheet was evaluated for printing in the same manner as described in Example 26. This transfer sheet exhibited high antistatic property as follows.

| | Saturated Potential | Half-life Period |
|---|---|---|
| Example 29 | −500 V | 10 seconds |

EXAMPLE 30

The same base film (4.5 μm) as that of Example 26 was used, and an ink layer and a filling layer containing a quaternary ammonium salt antistatic agent which have the following composition were formed to prepare a transfer sheet.

| Hot Melt Ink Layer: | |
|---|---|
| Carbon black "Siest SO" (manufactured by Tokai Denkyoku, Japan) | 15 parts |
| Ethylene-vinyl acetate copolymer "Evaflex 310" (manufactured by Mitsui Poly-chemical, Japan) | 7 parts |
| Paraffin wax "Paraffin 150° F." | 40 parts |
| Carnauba wax | 15 parts |

The hot melt ink layer was coated at a temperature of 120° C. in an amount of 3.5 $g/m^2$ by a hot melt roll coating process.

| Filling Layer: | |
|---|---|
| Carnauba emulsion "WE-90" (manufactured by Bond Wax Company) (40% solids) | 10 parts |
| 70% IPA aqueous solution | 30 parts |
| Antistatic "Arcard T-50" (manufactured by Lion Agzo, Japan) | 0.2 part |

The filling layer was coated in an amount of 0.5 $g/m^2$ by a gravure coating process.

Antisticking Layer: The same as that of Example 26

This transfer sheet was evluated for printing in the same manner as described in Example 26. This transfer sheet exhibited high antistatic property as follows.

| | Saturated Potential | Half-life Period |
|---|---|---|
| Example 30 | −300 V | 5 seconds |

As can be seen from Examples described above, the heat transfer sheet of the present invention has effects and advantages as described hereinafter.

(a) High quality printing can be attained even under severe conditions such as high speed heat transfer and the use of rough papers having a low surface smoothness as transferable papers.

(b) The present heat transfer sheet can effectively prevent the printed areas from occurring a void, collapse, bleeding and staining in both cases of low speed heat transfer printing and high speed heat transfer printing.

(c) When the coloring agent is added to the filling layer to impart color to the filling layer, it is superposed on the coloring agent of the hot melt ink composition to compensate the color of the ink composition. Further, when the coloring agent having hiding (masking) properties is used as the coloring agent described above, it masks the color of the surface of the transferable paper.

(d) When the filling layer is provided on the ink layer, the storage properties of the heat transfer sheet are improved. (When the filling layer is formed from the high melting materials, the storage properties are particularly good.)

(e) When the thermal head-contacting surface of the base film is provided with the antisticking layer, so-called "sticking phenomenon" (i.e., the base film may heat bond with the thermal head) can be effectively prevented.

(f) When the layer or layers constituting the heat transfer sheet contains the antistatic agent, various drawbacks due to static electricity can be overcome.

(g) When the releasable layer is interposed between the base film and the ink layer, the release of both layers can be readily carried out, transfer efficiency is improved, and release noise is also reduced. Further, in the case where the ink layer is transferred together with the releasable layer or the releasable layer is divided into two separate layers during the transferring operation, the wear resistance of the printed area improves.

(h) When the base film has a mat layer on its surface to which the ink layer is applied, or the base film surface to which the ink layer is mat processed, the gloss of the printed areas can be removed to obtain readily readable printing.

What is claimed is:

1. A heat transfer sheet for heat-sensitive printing by means of thermal heads, comprising a base film, a hot melt ink layer formed on the surface of said base film, and a filling layer formed on said hot melt ink layer;

said filling layer comprising a fine particle layer of wax.

2. A heat transfer sheet according to claim 1, wherein said filling layer is formed by coating the hot melt ink layer with a wax emulsion.

3. A heat transfer sheet according to claim 1, wherein said wax is selected from the group consisting of microcrystalline wax, carbauba wax, paraffin wax, Fischer-Tropsch wax, low molecular weight polyethylene, Japan wax, bees wax, whale wax, insect wax, wool wax, shellac wax, candelilla wax, montan wax, petrolatum, fatty acid esters and amides.

* * * * *

UNITED STATES PATENT AND TRADEMARK OFFICE
CERTIFICATE OF CORRECTION

PATENT NO. : 4,778,729

DATED : October 18, 1988

INVENTOR(S) : Akira MIZOBUCHI et al.

It is certified that error appears in the above-identified patent and that said Letters Patent is hereby corrected as shown below:

ON TITLE PAGE:

In section [75] after "Tokyo, Japan" insert --Yoshiaki Hida, Tokyo, Japan; Shigeki Umise, Tokyo, Japan; Kyoichi Yamamoto, Sagamihara-Shi, Japan; and Kyohei Takahashi, Sagamihara-Shi, JAPAN--.

Signed and Sealed this

Twenty-eighth Day of April, 1992

*Attest:*

HARRY F. MANBECK, JR.

*Attesting Officer*

*Commissioner of Patents and Trademarks*